(12) United States Patent
Yoneda

(10) Patent No.: US 6,370,014 B1
(45) Date of Patent: Apr. 9, 2002

(54) MONOLITHIC CERAMIC ELECTRONIC COMPONENT AND METHOD FOR MANUFACTURING THE SAME

(75) Inventor: Yasunobu Yoneda, Takefu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/642,543

(22) Filed: Aug. 18, 2000

(30) Foreign Application Priority Data

Aug. 19, 1999 (JP) .............................. 11-232797

(51) Int. Cl.[7] .................................. H01G 4/06
(52) U.S. Cl. ................. 361/321.2; 361/361; 361/321.4; 361/321.5; 29/25.41
(58) Field of Search ................................ 361/303, 305, 361/306.3, 308.1, 309, 310, 321.1–321.6; 29/25.41, 25.42, 851

(56) References Cited

FOREIGN PATENT DOCUMENTS

| JP | 3-116810 | 5/1991 |
|---|---|---|
| JP | 3116810 A * | 5/1991 |
| JP | 11-67588 | 3/1999 |

* cited by examiner

*Primary Examiner*—Anthony Dinkins
(74) *Attorney, Agent, or Firm*—Ostrolenk, Faber Gerb & Soffen, LLP

(57) ABSTRACT

A method for manufacturing a highly reliable laminated ceramic capacitor that hardly causes an interlayer peeling phenomenon such as delamination and hardly suffers invasion of a plating solution during plating or invasion of water and moisture during use, comprising the steps of: preparing a non-fired ceramic green chip comprising at least one layer of internal electrode containing a metallic compound comprising a metal that forms a solid solution with the internal electrode, or reacts with the internal electrode to form a compound, or segregates on the internal electrode or at the periphery of the internal electrode; firing the green chip to allow the metal in the metallic compound to form a solid solution with the internal electrode, to react with the internal electrode to form a compound, or to segregate the metallic compound on the internal electrode or at the periphery of the metallic compound, thereby enhancing the adhesion between the internal electrode and the ceramic; and forming external electrodes on the outer surfaces of the ceramic sintered body.

17 Claims, 1 Drawing Sheet

MONOLITHIC CERAMIC ELECTRONIC COMPONENT AND METHOD FOR MANUFACTURING THE SAME

BACKGROUND OF THE INVENTION

1. Field of the Invention

The present invention relates to a monolithic ceramic electronic component such as a laminated capacitor, and a method for manufacturing the same. In more detail, the present invention relates to a monolithic ceramic electronic component having a structure in which the adhesion between internal electrode and ceramic has been improved, and a method for manufacturing the same.

2. Description of the Related Art

Monolithic ceramic electronic components comprise a structure in which one or more internal electrodes are disposed within a sintered ceramic body. Monolithic ceramic electronic components known in the art include a laminated capacitor and laminated ceramic multilayer substrate.

A sintered ceramic body in which ceramic layers are laminated via internal electrodes is used for a monolithic ceramic electronic component. Adhesion between the internal electrode and the ceramic layer is aggressively required to be high in this sintered ceramic body. When the adhesive property between the ceramic layer and internal electrode is insufficient, an interlayer peeling phenomenon called delamination occurs, or a plating liquid invades the ceramic sintered body while forming external electrodes, sometimes resulting in peeling between the internal electrode and ceramic.

Occurrence of delamination as described above causes a decrease of insulation resistance, or deterioration of electrical characteristics required for use as electronic components such as capacitors.

Accordingly, various methods for improving the adhesive property has been attempted including forming perforation holes through the internal electrode to enhance the adhesive property between the ceramic layers at the upper and lower parts of the internal electrode, or mixing the same ceramic material as used in the ceramic sintered body into an electrode paste for forming the internal electrode to allow the ceramic in the internal electrode to diffuse toward the ceramic sintered body during firing.

However, the shape of the internal electrode turns out to be complicated in the ceramic electronic components manufactured by forming the perforation holes through the internal electrode, thus failing to obtain sufficient electrical characteristics.

Although the adhesive property between the internal electrode and ceramic is enhanced to some extent when the ceramic has been mixed with the internal electrode paste to allow the ceramic to diffuse toward the ceramic sintered body during firing, the adhesion between the internal electrode and the ceramic has been not always sufficient.

SUMMARY OF THE INVENTION

Accordingly, the object of the present invention is to provide a method for manufacturing a highly reliable monolithic ceramic electronic component in which the adhesive property between the internal electrode and the ceramic is effectively enhanced to decrease the occurrence of the interlayer peeling phenomenon such as delamination, and a method for manufacturing the same.

In accordance with the first aspect, the present invention provides a method for manufacturing a monolithic ceramic electronic component comprising the steps of: preparing a non-fired ceramic green chip comprising at least one layer of an internal electrode while containing a metallic compound that forms a compound by forming a solid solution with or by reacting with the internal electrode during firing; firing the green chip to allow the metal constituting the metallic compound to form a solid solution with the internal electrode or to react with the internal electrode to form a compound; and forming external electrodes on the outer surfaces of the sintered body.

In a second aspect, the present invention also provides a method for manufacturing a monolithic ceramic electronic component comprising the steps of: preparing a non-fired ceramic green chip comprising at least one layer of internal electrodes while containing a metallic compound that segregates on an internal electrode or at the periphery the internal electrode during firing the internal electrodes; obtaining a ceramic sintered body by firing the ceramic green chip while allowing the metallic compound to segregate on an internal electrode or at the periphery of the internal electrode; and forming external electrodes on the outer surfaces of the sintered body.

In the present invention according to the first and second aspects, the metallic compound containing a metal that forms a solid solution with the internal electrode or reacts with the internal electrode to form a compound, or a metallic compound that segregates on or at the periphery of the internal electrode is allowed to contain during forming internal electrodes in the ceramic in the step for preparing the ceramic green chip, thereby enhancing adhesive property between the internal electrode and the ceramic.

Although the method for manufacturing the ceramic electronic component according to the first and second aspects of the present invention can be applied for manufacturing various laminated ceramic components without any restrictions, it may be applied in the method for manufacturing a ceramic capacitor according to a specified aspect of the present invention. The ceramic green chip to be used in obtaining a laminated ceramic capacitor comprises a plurality of the internal electrodes being laminated via the ceramic layer, and has a structure in which the plural internal electrodes alternately extend along the direction of thickness to a pair of the end faces of the ceramic green chip in opposed relation one another.

The present invention also provides a monolithic ceramic electronic component obtained by the method for manufacturing the monolithic ceramic electronic component according to the present invention, comprising: a ceramic sintered body; at least one layer of internal electrodes disposed within the ceramic sintered body; and external electrodes formed on the outer surfaces of the ceramic sintered body and electrically connected to the internal electrodes, wherein the metal constituting the metallic compound contained in the ceramic forms a solid solution with the internal electrode or reacts with the internal electrode to form a compound in the ceramic sintered body.

The present invention further provides a monolithic ceramic electronic component obtained by the method for manufacturing the monolithic ceramic electronic component according to the present invention, comprising: a ceramic sintered body; at least one layer of internal electrodes disposed within the ceramic sintered body; and external electrodes formed on the outer surfaces of the ceramic sintered body and electrically connected to the internal electrodes, wherein the metallic compound contained in the ceramic sintered body is segregated on the internal electrode or at the periphery of the internal electrode.

Examples of the monolithic ceramic electronic component according to the present invention may include, without being restrictive, a monolithic ceramic electronic component wherein a plurality of the internal electrodes are disposed so as to be laminated along the direction of thickness via the ceramic layer, the internal electrodes being alternately extending along the direction of thickness to end faces of the ceramic green chip in opposed relation one another, and wherein a pair of the external electrodes are formed on the end faces of the ceramic sintered body in opposed relation one another.

Details of the embodiments according to the present invention will be described hereinafter.

First Embodiment

A non-fired ceramic green chip is prepared at first in the method for manufacturing a monolithic ceramic electronic component according to the first embodiment of the present invention. The non-fired ceramic green chip comprises at least one layer of the internal electrodes as well as a metallic compound containing a metal that forms a solid solution with the internal electrode or react with the internal electrode to form a compound during firing.

Electrode materials constituting the internal electrode are not particularly limited, but appropriate metals such as Ag, Pd, Cu and Ni, and an alloy such as a Ag—Pd alloy, that are available for a conventional internal electrode material in the monolithic ceramic electronic component may be used. Ceramic materials constituting the ceramic green chip are also not particularly limited, but appropriate ceramics such as dielectric ceramics, magnetic ceramics and piezoelectric ceramics that are available for conventional laminated capacitors and laminated inductors may be used.

Metallic compounds comprising a metal that forms a solid solution with the internal electrode or reacts with the internal electrode to form a compound during firing may be appropriately selected depending on the metallic material constituting the internal electrode. For example, the metallic compound containing a metal that forms a solid solution with the internal electrode includes a compound of Cu, Au or Pd when the internal electrode is formed of Ag, a compound of Ag or Au when the internal electrode is formed of Pd, a compound of Cu or Co when the internal electrode is formed of Ni, and a compound of Ni or Ag when the internal electrode is formed of Cu.

Metallic compounds comprising a metal that forms a compound by reacting with the internal electrode may be also appropriately selected depending on the metallic material constituting the internal electrode. For example, a compound such as PdO may be used when the internal electrode is formed of Ag, a compound such as $Bi_2O_3$ may be used when the internal electrode is formed of Pd, compounds such as MgO and $Al_2O_3$ may be used when the internal electrode is formed of Ni, and compounds such as NiO and $Al_2O_3$ may be used when the internal electrode.

The metallic compound containing a metal that forms a solid solution with the internal electrode, and the metallic compound that forms a compound by reacting with the internal electrode may be used together.

Although the content of the metallic compound that forms a solid solution with the internal electrode, or forms a compound by reacting with the internal electrode in the ceramic, cannot be definitely defined since it differs depending on the kind of the internal electrode material and the metallic compound, the desired electrical characteristics of the monolithic ceramic electronic component may be deteriorated when the content of the metallic compound is too high. Accordingly, the metallic compound is desirably contained in a proportion of about 3% by weight or less in the ceramics after firing.

The method for preparing the non-fired ceramic green chip is not particularly restricted, but it may be prepared according to the method for manufacturing conventional monolithic ceramic electronic components. For example, a ceramic green sheet may be obtained by forming a ceramic slurry into a sheet after preparing the ceramic slurry containing the metallic compound as described above. The ceramic green sheet can be obtained by screen-printing an internal electrode paste on the ceramic green sheet, and laminating a plurality of the ceramic green sheet on which the internal electrode has been printed, followed by laminating plain ceramic green sheets on and under the laminated ceramic green sheets.

The method for forming the internal electrode is not restricted to screen-printing of a conductive paste, but any film-coating method such as vapor-deposition, plating or sputtering may be used.

Alternatively, the non-fired ceramic green chip may be prepared by alternately depositing the ceramic paste and a material constituting the internal electrode on a support, after preparing the ceramic paste containing the metallic compound.

The adhesive property between the ceramic green sheets, or between the ceramic layers, can be enhanced by pressing the green chip along the direction of thickness, prior to firing the green chip.

Baking of the internal electrode and sintering of the ceramic layers are carried out by firing the laminated green chip. The metal constituting the metallic compound may form a solid solution with the internal electrode or may react with the internal electrode to form a compound. As a result, the adhesive property between the internal electrode and the ceramic layer is effectively enhanced by forming a solid solution or by a reaction between them.

After obtaining a ceramic sintered body by the method as described above, external electrodes are formed on the outer surfaces of the ceramic sintered body. The method for forming the external electrode is also not particularly limited, but an appropriate method such as coating and baking of a conductive paste, plating, vapor-deposition or sputtering may be used. The external electrode may be also formed by a combined method of the foregoing methods or may be formed to be laminated metal films.

The metallic material constituting the external electrode is also not particularly limited, but appropriate metallic materials such as Ag, Sn and Ni that are conventionally used for the external electrode of the monolithic ceramic electronic component may be used.

The monolithic ceramic electronic component according to the present invention can be obtained by the procedure as described above.

At least one layer of the internal electrode may be disposed in the ceramic sintered body for use in the monolithic ceramic electronic component according to the present invention or, in other words, the number of lamination of the internal electrode is not restrictive.

The adhesive property between the internal electrode and the ceramic is enhanced, as hitherto described, because the metal constituting the metallic compound contained in the ceramic forms a solid solution with the internal electrode or reacts with the internal electrode to form a compound in the monolithic ceramic electronic component obtained. Accordingly, delamination may be effectively suppressed thus enabling reliability of the monolithic ceramic electronic component to be improved.

Second Embodiment

A metallic compound that segregates on the internal electrode or at the periphery of the internal electrode during firing is used for preparing a non-fired ceramic green chip in the second embodiment of the present invention, instead of the metallic compound that forms a solid solution with the internal electrode or reacts with the internal electrode to form a compound. The other manufacturing steps are the same as used in the first embodiment.

While examples of the metallic compound that segregates on the internal electrode or at the periphery of the internal electrode include CuO, MgO, $SiO_2$ and CaO, the kind of the segregating compounds may be appropriately selected depending on the materials for use in the internal electrode.

The content of the metallic compound that segregates on the internal electrode or at the periphery of the internal electrode is, through it may be different depending on the kind of the metallic compound, desirably about 3% by weight or less. When the content exceeds about 3% by weight, electrical characteristics desirable for the ceramic sintered body may fail to be exhibited.

Segregation on or at the periphery of the internal electrode during firing corresponds not only to segregation on the surface of the internal electrode, but also to segregation in the vicinity of the surface of the internal electrode.

Since the second embodiment of the present invention is similar to the first embodiment of the present invention, except that a metallic compounds that segregates on the internal electrode or at the periphery of the internal electrode is used as described above, the description in the first embodiment will be cited herein and the other descriptions are omitted.

A monolithic ceramic electronic component according to another embodiment of the present invention is obtained by forming external electrodes on the outer surfaces of the ceramic sintered body in the second embodiment. Since the metallic compound contained in the ceramic sintered body segregates on the internal electrode or at the periphery of the internal electrode in the monolithic ceramic electronic component, the adhesive property between the internal electrode and the ceramic layer is enhanced by segregation of the metallic compound. Consequently, delamination is suppressed as in the first embodiment, thereby to effectively improve reliability of the monolithic ceramic electronic component.

APPLICATION OF THE INVENTION

The present invention may be generally used for the monolithic ceramic electronic components including, for example, laminated capacitors, laminated inductors, laminated piezoelectric components, laminated thermistors and ceramic-coated substrates.

A laminated capacitor is constructed using a ceramic green chip comprising a dielectric ceramic containing the metallic compound as hitherto described.

DESCRIPTION OF THE PREFERRED EMBODIMENT

Figure 1:
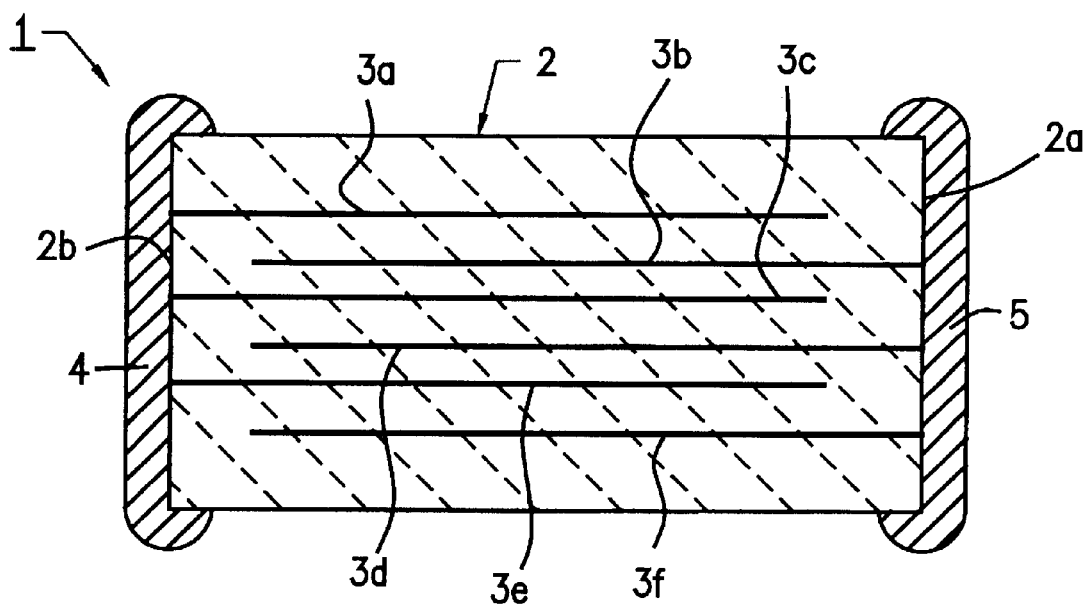
FIG. 1 shows a cross section for describing the laminated capacitor obtained by the method for manufacturing the monolithic ceramic electronic component according to the present invention.

The present invention will be described in more detail with reference to the examples of the present invention.

EXAMPLE 1

Starting materials of oxides of Ba, Sr, Ca, Ti, Zr, Sn, Pb, B, rare earth elements, Cu and Cr were weighed, calcinated and ground to obtain a calcinated powder. A ceramic slurry was obtained by adding a binder and an organic solvent to the calcinated powder with mixing. The Cu oxide among the oxides above serves as a metallic compound containing Cu as a metal that forms a solid solution with the internal electrode during firing.

The content of the Cu oxide was adjusted to be 2% by weight in the ceramic composition.

A ceramic green sheet was formed using the ceramic slurry, and internal electrodes were formed on the ceramic green sheet by printing an Ag paste. Thirty sheets of the ceramic green sheet on which respective internal electrodes had been printed were laminated thereafter so as to construct a laminated capacitor, and a ceramic green chip was obtained by laminating 20 sheets each of the plain ceramic green sheets on the top and bottom faces of the laminated capacitor, respectively.

The ceramic green chip was then fired after pressing it along the direction of thickness. A Ag paste was coated on the end faces of the ceramic sintered body thus obtained. The coated paste was baked, and a Ni film and Sn film was layered on the baked paste by wet-plating to form external electrodes, thereby obtaining a laminated capacitor.

The structure of the laminated capacitor obtained as described above is shown in FIG. 1. The laminated capacitor 1 comprises a ceramic sintered body 2. The ceramic sintered body 2 is composed of the dielectric ceramic as described above, in which the internal electrodes 3a to 3f are disposed so as to be stacked along the direction of thickness via the ceramic layer. The internal electrodes 3a to 3f alternately extend to end face 2a or 2b along the direction of thickness of the ceramic sintered body 2. External electrodes 4 and 5 are formed so as to cover the end faces 2a and 2b.

The external electrode 4 is electrically connected to the internal electrodes 3a, 3c and 3e, while the external electrode 5 is electrically connected to the internal electrodes 3b, 3d and 3f.

The internal electrodes formed within the laminated capacitor as described above were evaluated with respect to incidence of delamination after wet-plating. The results indicated that no capacitor among 100 pieces of the laminated capacitor suffered delamination at all.

A ceramic slurry for comparative purposes was prepared by the same method as described above except that the Cu oxide was not included, and a laminated capacitor was also manufactured by the same method as described above. Incidence of delamination after wet-plating was also evaluated with respect to the comparative laminated capacitors thus obtained, indicating that 10 pieces of the laminated capacitors among 100 pieces of the capacitors suffered delamination.

Each of the laminated capacitors prepared as described above was then cut, and the appearance in the vicinity of the interface between the internal electrode and ceramic layer was observed with an optical microscope. This showed that a part of the component constituting the ceramic layer had formed a solid solution in the internal electrode in the laminated capacitor according to the example. On the contrary, only a few instances of solid solution invading through the interface between the ceramic and the internal electrode was found in the laminated capacitor in the comparative example.

Accordingly, the adhesive property between the internal electrode and the ceramic is enhanced in the laminated capacitor in the example by allowing Cu to form a solid solution with the internal electrode, as is made clear by the comparison between the capacitors in the example and in the comparative example.

According to the first embodiment, since a metallic compound comprising a metal that forms a solid solution with the internal electrode, or comprising a metal that reacts with the internal electrode to form a compound, during firing is contained in the ceramic green chip prepared, the metal constituting the metallic compound forms a solid solution with the internal electrode, or the metal reacts with the internal electrode to form a compound. As a result, the adhesive property between the internal electrode and the ceramic is effectively enhanced in the ceramic sintered body obtained. Consequently, a ceramic sintered body that hardly exhibits an interlayer peeling phenomenon such as delamination can be obtained, thereby enabling a highly reliable monolithic ceramic electronic component to be obtained, wherein the plating solution can hardly invade into the ceramic sintered body when it is subjected to wet-plating, or water and moisture can seldom invade into the laminated ceramic sintered body even when it is used under a high humidity environment.

In the method for manufacturing the monolithic ceramic electronic component according to the second embodiment of the present invention, since a metallic compound that segregates on the internal electrode or at the periphery of the internal electrode is contained in the non-fired ceramic green chip, the metallic compound segregates on the internal electrode or at the periphery of the internal electrode in the ceramic sintered body obtained, and thereby the adhesive property between the internal electrode and the ceramic is effectively enhanced. Accordingly, a ceramic sintered body that hardly exhibits delamination can be obtained as in the first embodiment, making it possible to provide a highly reliable monolithic ceramic electronic component.

In the method for manufacturing the monolithic ceramic electronic component according to the first and second embodiment of the present invention, a ceramic green sheet having a plurality of laminated internal electrodes via the ceramic layer is used, wherein the plural internal electrodes alternately extend along the direction of thickness to a pair of the end faces of the ceramic green sheet in opposed relation one another. A laminated capacitor can be obtained by forming the external electrodes on both end faces of the ceramic sintered body. A highly reliable laminated capacitor that hardly exhibits delamination can be also obtained by the method as described above, because the metal constituting the metallic compound forms a solid solution with the internal electrode, or reacts with the internal electrode to form a compound, or the metallic compound segregates on the internal electrode or at the periphery of the internal electrode.

The monolithic ceramic electronic component according to the third embodiment of the present invention is obtained by the method for manufacturing the monolithic ceramic electronic component according to the first embodiment, wherein the metal in the metallic compound contained in the ceramic forms a solid solution with the internal electrode or reacts with the internal electrode to form a compound. As a result, the adhesive property between the internal electrode and the ceramic is effectively enhanced, and thereby a reliable monolithic ceramic electronic component can be provided without allowing the plating solution to invade into the ceramic sintered body, or without allowing water and moisture to invade into the monolithic ceramic electronic component during use.

The monolithic ceramic electronic component according to the fourth embodiment of the present invention is obtained by the method for manufacturing the monolithic ceramic electronic component according to the second embodiment of the present invention, wherein the adhesive property between the internal electrode and the ceramic is efficiently enhanced because the metallic compound segregates on the internal electrode or at the periphery of the internal electrode. Consequently, a highly reliable monolithic ceramic electronic component can be provided without allowing the plating solution to invade even when the external electrode is formed by wet-plating, or water and moisture hardly invades into the monolithic ceramic electronic component during use.

The monolithic ceramic electronic component according to the third and fourth embodiments can be used for various monolithic ceramic electronic components. The structure, in which a plurality of the internal electrodes are disposed so as to be laminated along the direction of thickness via the ceramic layer, and in which the plural electrodes alternately extend along the direction of thickness to opposed end faces of the ceramic sintered body besides forming a pair of the external electrodes on the opposed end faces of the ceramic sintered body, allows a highly reliable laminated capacitor to be provided.

What is claimed is:

1. A method for manufacturing a monolithic ceramic electronic component comprising:

preparing a non-fired ceramic green chip comprising at least one layer of ceramic and at least one layer of an internal electrode and containing a metallic compound comprising a metal that forms a solid solution or reacts with the internal electrode or which segregates on or about the periphery of the internal electrode during firing;

firing the green chip under conditions in which the metal constituting the metallic compound forms a solid solution or reacts to form a compound with the internal electrode or segregates on or about the periphery of the internal electrode and said solution or compound is the only entity between said ceramic and said internal electrode; and forming a pair of external electrodes on outer surfaces of the sintered body.

2. A method for manufacturing a monolithic ceramic electronic component according to claim 1, wherein the internal electrode comprises Ag, Pd, Cu, Ni and Ag—Pd alloy.

3. A method for manufacturing a monolithic ceramic electronic component according to claim 1, wherein the metallic compound forms a solid solution or reacts with the internal electrode.

4. A method for manufacturing a monolithic ceramic electronic component according to claim 3, wherein the metallic compound is a compound of Cu, Au, Pd, Ag or Ni.

5. A method for manufacturing a monolithic ceramic electronic component according to claim 3, wherein the metallic compound is selected from the group consisting of PdO, $Bi_2O_3$, MgO, $Al_2O_3$ and NiO.

6. A method for manufacturing a monolithic ceramic electronic component according to claim 1, wherein the metallic compound segregates on or about the periphery of the internal electrode during firing.

7. A method for manufacturing a monolithic ceramic electronic component according to claim 6, wherein the metallic compound is selected from the group consisting of CuO, MgO, $SiO_2$ and CaO.

8. A method for manufacturing a monolithic ceramic electronic component according to claim 6, wherein the amount of metallic compound in the green chip is about 3% by weight or less.

9. A method for manufacturing a monolithic ceramic electronic component according to claim 1, wherein the ceramic green chip comprises a plurality of internal electrodes separated from one another via at least one ceramic layer, the plurality of internal electrodes alternately extending along the direction of thickness to a pair of end faces of the ceramic green chip in opposed relation one another, and wherein the external electrodes are formed on said pair of end faces of the ceramic sintered body.

10. A monolithic ceramic electronic component obtained by the method for manufacturing the monolithic ceramic electronic component according to claim 1, comprising:

a ceramic sintered body;

an internal electrode disposed within the ceramic sintered body; and external electrodes disposed on separated outer surfaces of the ceramic sintered body and electrically connected to an internal electrode, wherein the internal electrode has a metal in solid solution therein or reacted therewith or a metallic compound at or about its periphery.

11. A monolithic ceramic electronic component according to claim 10 having at least two layers of internal electrode separated by ceramic and a pair of external electrodes, each of which is electrically connected to a different internal electrode.

12. A monolithic ceramic electronic component according to claim 11, wherein the internal electrode has a metal in solid solution therein or reacted therewith.

13. A monolithic ceramic electronic component according to claim 12, wherein the internal electrode comprises Ag, Pd, Cu, Ni and Ag—Pd alloy and wherein the metal is Cu, Au, Pd, Ag or Ni.

14. A monolithic ceramic electronic component according to claim 12, wherein a plurality of the internal electrodes are disposed so as to be laminated along the direction of thickness via the ceramic layer, the internal electrodes alternately extending along the direction of thickness to the end faces of the ceramic green chip in opposed relation to one another, and wherein the pair of the external electrodes are on the end faces of the ceramic sintered body in opposed relation one another and in electrical contact with different internal electrodes.

15. A monolithic ceramic electronic component according to claim 11, wherein the internal electrode has a metallic compound segregated on or about its periphery.

16. A monolithic ceramic electronic component according to claim 15, wherein the metallic compound is selected from the group consisting of CuO, MgO, $SiO_2$ and CaO.

17. A monolithic ceramic electronic component according to claim 15, wherein a plurality of the internal electrodes are disposed so as to be laminated along the direction of thickness via the ceramic layer, the internal electrodes alternately extending along the direction of thickness to the end faces of the ceramic green chip in opposed relation to one another, and wherein the pair of the external electrodes are on the end faces of the ceramic sintered body in opposed relation one another and in electrical contact with different internal electrodes.

* * * * *